US007278406B2

(12) United States Patent
Hagler

(10) Patent No.: US 7,278,406 B2
(45) Date of Patent: Oct. 9, 2007

(54) SPIRAL-WOUND HYDROCARBON ADSORBER FOR AN AIR INTAKE OF AN INTERNAL COMBUSTION ENGINE

(75) Inventor: Dean R. Hagler, Davison, MI (US)

(73) Assignee: Delphi Technologies, Inc., Troy, MI (US)

( * ) Notice: Subject to any disclaimer, the term of this patent is extended or adjusted under 35 U.S.C. 154(b) by 10 days.

(21) Appl. No.: 11/406,767

(22) Filed: Apr. 19, 2006

(65) Prior Publication Data
US 2006/0185651 A1 Aug. 24, 2006

Related U.S. Application Data

(63) Continuation-in-part of application No. 11/044,504, filed on Jan. 27, 2005, now Pat. No. 7,222,612.

(51) Int. Cl.
B01D 53/02 (2006.01)
B01D 39/04 (2006.01)
F02M 37/20 (2006.01)

(52) U.S. Cl. .......................... 123/516; 96/296; 55/498

(58) Field of Classification Search ................ 123/516, 123/518, 519; 55/483, 492, 498, 499, 500
See application file for complete search history.

(56) References Cited

U.S. PATENT DOCUMENTS

| | | | | | |
|---|---|---|---|---|---|
| 2,397,759 | A | * | 4/1946 | Sigmund | 55/484 |
| 3,020,977 | A | * | 2/1962 | Huppke et al. | 55/520 |
| 3,477,210 | A | * | 11/1969 | Hervert | 96/144 |
| 3,541,765 | A | * | 11/1970 | Adler et al. | 96/138 |
| 3,572,013 | A | * | 3/1971 | Hansen | 96/138 |
| 3,678,663 | A | * | 7/1972 | Hansen | 96/141 |
| 4,261,717 | A | * | 4/1981 | Belore et al. | 96/112 |
| 4,276,864 | A | * | 7/1981 | Waschkuttis | 123/544 |
| 5,562,825 | A | * | 10/1996 | Yamada et al. | 210/321.74 |
| 5,908,480 | A | * | 6/1999 | Ban et al. | 55/482 |
| 6,379,407 | B1 | * | 4/2002 | Blackwell et al. | 55/282.3 |
| 6,432,179 | B1 | * | 8/2002 | Lobovsky et al. | 96/296 |
| 6,440,200 | B1 | * | 8/2002 | Sakakibara et al. | 96/134 |
| 6,464,761 | B1 | * | 10/2002 | Bugli | 96/135 |
| 6,505,610 | B2 | * | 1/2003 | Everingham et al. | 123/516 |
| 6,637,415 | B2 | * | 10/2003 | Yoshioka et al. | 123/518 |
| 6,692,551 | B2 | * | 2/2004 | Wernholm et al. | 95/146 |
| 6,692,555 | B2 | * | 2/2004 | Oda et al. | 96/134 |
| 6,698,403 | B2 | * | 3/2004 | Honda et al. | 123/520 |
| 6,699,310 | B2 | * | 3/2004 | Oda et al. | 96/132 |

(Continued)

Primary Examiner—Thomas Moulis
(74) Attorney, Agent, or Firm—Paul L. Marshall

(57) ABSTRACT

A low-resistance hydrocarbon adsorber comprising a spiral-wound laminated structure for mounting into an entrance port of an engine air intake system to prevent hydrocarbon evaporations from reaching atmosphere. Preferably, the adsorber is formed as a cartridge and comprises a flexible polymeric sheet support to which a thin flexible sheet of activated carbon sheeting is laminated on a first support side. The support is provided on a second side with features, for example, ribs or bumps, extending above the surface. When the laminate is spirally wound, the spiral convolutions are spaced apart by the features. Preferably, the convolutions are spaced apart by a distance such that there is a high probability that hydrocarbons migrating out of a shut down engine will encounter the adsorber and thus be adsorbed before reaching the atmosphere. The windings may fill all or a portion of the open area of the intake port.

6 Claims, 3 Drawing Sheets

U.S. PATENT DOCUMENTS

| | | | |
|---|---|---|---|
| 6,736,871 B1 * | 5/2004 | Green et al. | 55/385.3 |
| 6,758,885 B2 * | 7/2004 | Leffel et al. | 96/134 |
| 6,786,199 B2 * | 9/2004 | Oda et al. | 123/399 |
| 6,835,234 B2 * | 12/2004 | Leffel et al. | 96/108 |
| 6,835,237 B2 * | 12/2004 | Ishida | 96/135 |
| 6,959,696 B2 * | 11/2005 | Shears et al. | 123/516 |
| 6,976,477 B2 * | 12/2005 | Gimby et al. | 123/519 |
| 7,028,673 B2 * | 4/2006 | Itou et al. | 123/516 |
| 7,211,226 B2 * | 5/2007 | Liu et al. | 422/168 |
| 2005/0081712 A1 * | 4/2005 | Koslow | 95/90 |
| 2005/0178368 A1 * | 8/2005 | Donahue et al. | 123/520 |
| 2005/0188962 A1 * | 9/2005 | Oda et al. | 123/519 |
| 2005/0235967 A1 * | 10/2005 | Itou et al. | 123/518 |
| 2006/0096458 A1 * | 5/2006 | Abdolhosseini et al. | 96/134 |
| 2006/0150811 A1 * | 7/2006 | Callahan et al. | 95/146 |
| 2006/0185651 A1 * | 8/2006 | Hagler | 123/518 |

\* cited by examiner

SPIRAL-WOUND HYDROCARBON ADSORBER FOR AN AIR INTAKE OF AN INTERNAL COMBUSTION ENGINE

RELATIONSHIP TO OTHER APPLICATIONS AND PATENTS

The present application is a Continuation-In-Part of a U.S. patent application Ser. No. 11/044,504, filed Jan. 27, 2005 now U.S. Pat. No. 7,222,612.

TECHNICAL FIELD

The present invention relates to internal combustion engines; more particularly, to devices for controlling hydrocarbon emissions from internal combustion engines; and most particularly, to a spiral-wound hydrocarbon adsorber, having low resistance to air flow, for preventing hydrocarbon leakage from the intake manifold of an internal combustion engine after engine shutdown.

BACKGROUND OF THE INVENTION

Gasoline-fueled motor vehicles have many sites from which hydrocarbons (HC) may evaporate into the environment. HC in the atmosphere is a major contributor to smog formation. One such known site is the intake manifold of an engine. As HC emission regulations are tightened, a mechanism is needed to prevent HC vapor from escaping from the intake manifold after engine shutdown. Known approaches have included, among others, closing off the intake and idle air with the throttle valve when the engine is shut off; adding a rigid monolith structure formed of activated carbon into the intake air flow path of the air cleaner (see U.S. Pat. No. 6,692,551 B2); and lining the intake manifold, other air ducts, and/or the air cleaner with adsorptive carbon sheeting.

Closing the intake and idle air with the throttle valve requires that the engine be equipped with electronic throttle control; many inexpensive engines are not so equipped. Further, so employing an engine's electronic throttle control may impair the desirable option of so-called "limp home" mode in which a vehicle may be driven in event of a partial failure of the engine electronics control system.

Carbon sheeting applied to inner surfaces of the manifold and air ducts is only partially successful because some HC laden air could escape the manifold without being brought into proximity with an adsorptive surface. Relatively large areas of carbon sheeting are required to ensure that an adequate quantity of HC comes into contact with the adsorber.

An adsorptive rigid monolith formed from activated carbon is unsatisfactory as it is expensive to fabricate, brittle and therefore vulnerable to breakage during assembly and use, and inherently restricts the flow of intake air. A known carbon monolith has an open area of only about 80%. The last shortcoming is especially undesirable as both engine performance and fuel efficiency can be adversely affected by undue air flow restriction.

What is needed in the art is a means for providing hydrocarbon adsorption during engine shutdown near the main air entrance to an engine while minimizing intake air restriction during engine operation.

It is a principal object of the present invention to reduce hydrocarbon emissions from a shut down internal combustion engine.

It is a further object of the invention to minimize the restriction of combustion air inflow into the engine caused by a hydrocarbon-adsorptive device.

SUMMARY OF THE INVENTION

Briefly described, a low-flow resistance hydrocarbon adsorber in accordance with the invention comprises a spiral-wound structure for mounting into an entrance port of an engine air intake system for adsorbing hydrocarbon evaporations and thereby preventing such evaporations from reaching atmosphere outside the engine. In a currently-preferred embodiment, the structure is formed as a cartridge to permit ready replacement as needed. The structure comprises a flexible inert polymeric sheet support, for example, polyethylene or polypropylene sheet, to which a thin flexible sheet of activated carbon sheeting is laminated on a first support side. The support is provided on a second and obverse side with a plurality of features, for example, ribs or bumps, extending above the surface such that when the laminate is spirally wound the spiral convolutions are spaced apart by the plurality of features. The spiral-wound structure is oriented and mounted into an air intake manifold inlet port with the spiral axis being parallel to the direction of air flow. Preferably, the convolutions are spaced apart by a distance (the height of the features) that is small relative to the extent of the structure in the direction of engine air flow such that a high probability is created that hydrocarbons migrating out of a shut down engine's intake manifold will encounter an adsorptive surface and thus be adsorbed before reaching the atmosphere. The spiral windings may fill all or only a portion of the open area of the intake duct. If spacing permits, the windings could be positioned so that the inner diameter of the hydrocarbon adsorber does not encroach into the air flow path.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
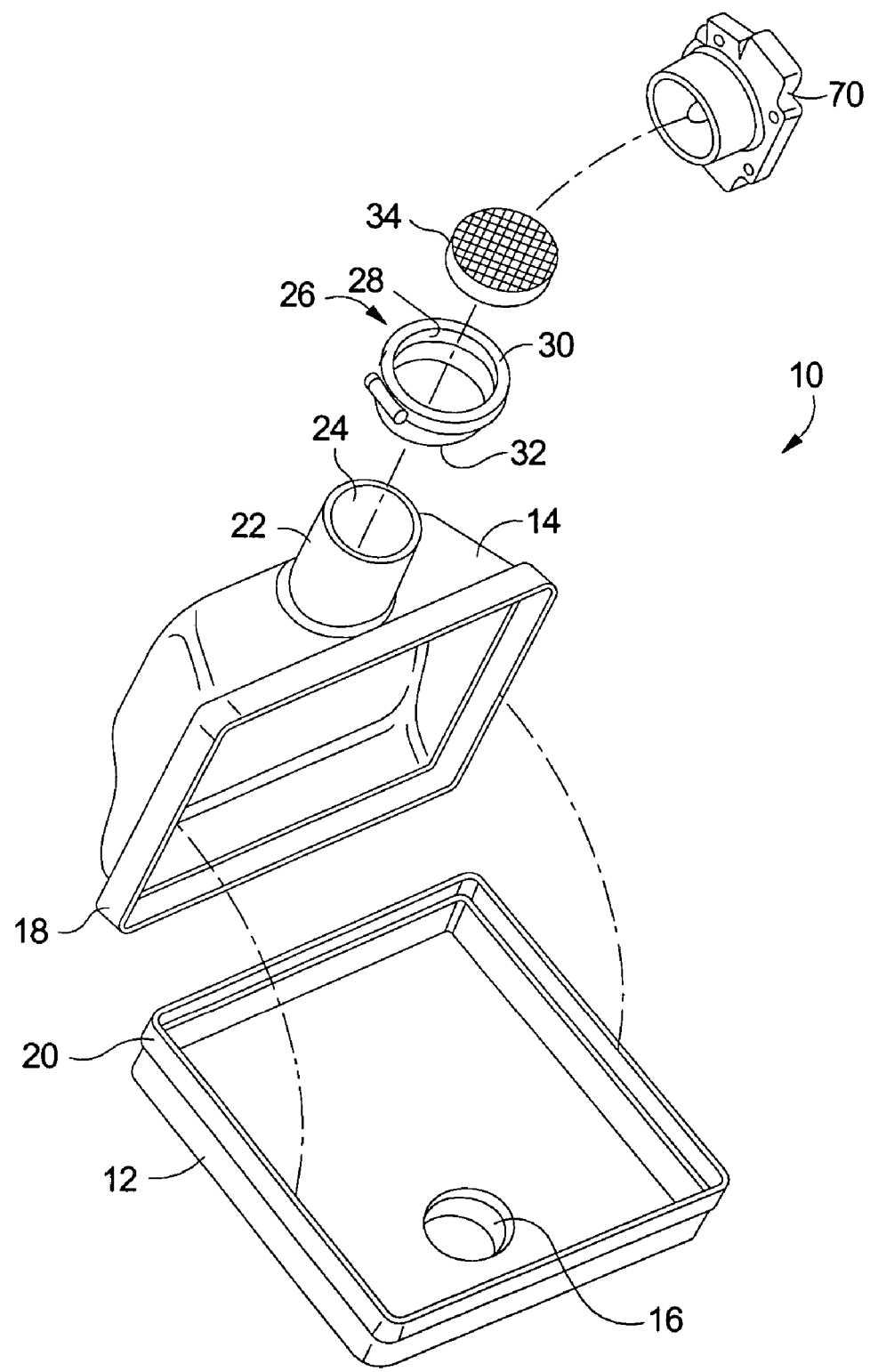
FIG. 1 is an exploded isometric view of a first prior art rigid hydrocarbon adsorber, comprising a rigid monolith, installed in an air intake for an internal combustion engine.

Referring now to FIG. 1, there is shown an exploded perspective view of a prior art engine intake air cleaner assembly 10 substantially as disclosed in U.S. Pat. No. 6,692,551 B2, the relevant disclosure of which is incorporated herein by reference. Air cleaner assembly 10 generally comprises a lower case 12 and an upper case 14 that houses one or more filter elements (not shown) for removing particulate matter from an air stream during operation of the internal combustion engine. Conduit 22 extends from upper case 14 to provide inlet-opening 24. Preferably, conduit 22 is cylindrically shaped having an annular wall structure.

During operation, inlet opening 24 permits entry of air into air cleaner assembly 10 and thence to the engine combustion chamber or chambers.

A retainer 26, preferably made from a resilient material, is disposed onto conduit 22 of upper case 14 and has a first open end 30 and a second open end 32.

An adsorber member 34, also referred to as a flow straightener, is press fit into the opening defined by the first open end 30. The conformity of shape of first open end 30 is preferably such as to produce an airtight seal between adsorber member 34 and wall 28 defining first open end 30. As such, adsorber member 34 can generally be any shape that conforms to the shape of the opening defined by the first open end 30. In this manner, all gases flowing into the air cleaner assembly 10 must flow through the adsorber member 34. Likewise, any gases contained within the air cleaner assembly 10 such as, for example, those fuel gases that may accumulate in the air cleaner assembly 10 or migrate from the intake manifold after engine shutoff, must pass through the adsorber member 34 in order to escape the engine and enter the atmosphere.

Prior art adsorber member 34 may comprise a substrate coated with pollutant treating material. The substrate can include any material designed for use in a spark ignition or diesel engine environment and which is capable of operating at elevated temperatures dependent upon the device's location and the type of system, which is capable of withstanding exposure to hydrocarbons, nitrogen oxides, carbon monoxide, particulate matter (e.g., soot and the like), carbon dioxide, and/or sulfur, and which has sufficient surface area and structural integrity to support a pollutant treating material, and, where desired, a catalyst. Some possible support materials include cordierite, silicon carbide, metal, metal oxides (e.g., alumina, and the like), glasses, and the like, and mixtures comprising at least one of the foregoing materials. Some ceramic materials include "Honey Ceram", commercially available from NGK-Locke, Inc, Southfield, Mich., and "Celcor", commercially available from Corning, Inc., Corning, N.Y. These materials are preferably in the form of monoliths (e.g., a honeycomb structure, and the like). Preferred monolith supports are carriers of the type having a plurality of fine, parallel gas flow passages extending therethrough from an inlet face to an outlet face of the carrier so that the passages are open to air flow entering and passing through the monolith.

Although the substrate can have any size or geometry, the prior art size and geometry are preferably chosen to optimize surface area in the given design parameters. Preferably, the prior art substrate has a honeycomb geometry, with the combs' through-channels having any multi-sided or rounded shape, with substantially square, triangular, pentagonal, hexagonal, heptagonal, or octagonal or similar geometries preferred due to ease of manufacturing and increased surface area. Also, although each comb forming the honeycomb may be of a different size, the prior art substrate preferably comprises a honeycomb structure wherein all combs are of about equal size. The substrate may comprise about 60 to about 600 or more fluid passageways (cells) per square inch of cross section. The thickness of the substrate may be about ⅛ inch to about 12 inches with about 0.5 to about 3 inches preferred. Preferably the passages are essentially straight from their inlet to their outlet and are defined by walls in which the pollutant treating material may be coated as a washcoat so that the gases flowing through the passages contact the pollutant treating material.

The pollutant treating material can be capable of adsorbing pollutants contained in the air surrounding the substrate. Although the types of pollutants may vary widely depending on the environmental conditions to which the adsorber member 34 is exposed, contemplated pollutants include, but are not limited to, saturated and unsaturated hydrocarbons, certain carbon oxides (e.g., carbon monoxide), nitrates, sulfides, ozone, and the like, and combinations comprising at least one of the foregoing. Such pollutants may typically comprise 0 to 400 parts per billion (ppb) ozone, 1 to 20 parts per million carbon monoxide, 2 to 3000 ppb unsaturated hydrocarbons such as $C_2$ to $C_{20}$ olefins and partially oxygenated hydrocarbons such as alcohols, aldehydes, esters, ketones, and the like. In a preferred embodiment, the pollutant treating material selectively adsorbs unsaturated hydrocarbons such as those unsaturated hydrocarbons utilized in fuels and byproducts caused by combustion.

The pollutant treating material may include adsorbers, such as silicate materials, activated carbon, activated carbons, sulfides, and the like, and combinations comprising at least one of the foregoing.

As noted above, a honeycomb monolith structure preferred in accordance with the prior art, although an effective adsorber of hydrocarbons and other environmental pollutants, creates a large and undesirable pressure drop and flow restriction in the intake air flow path due to a large cross-sectional area of the structure and small-diameter air passages. What is needed is a cartridge for replacing a honeycomb monolith structure which has a large adsorptive surface area to maintain high adsorption but a low cross-sectional area to reduce intake air flow restriction and viscous drag flow losses.

Figure 2:
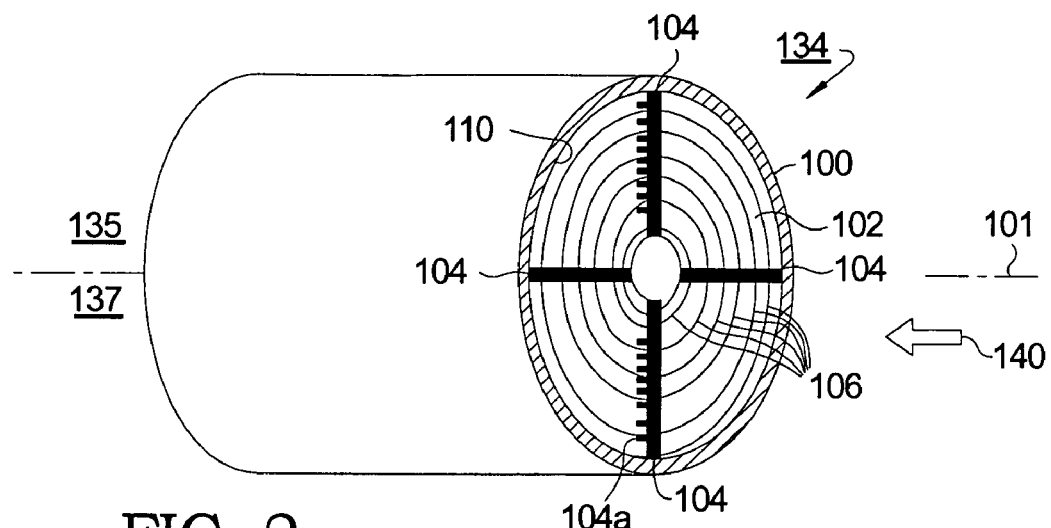
FIG. 2 is an isometric view of a prior art cartridge comprising a spiral-wound carbon paper adsorption element.

Referring to FIG. 2, a second prior art embodiment 134 of a cartridge is substantially as disclosed in parent US patent application Ser. No. 11/044,504. Embodiment 134 is suitable for use anywhere in an intake system 135 of an internal combustion engine 137 and preferably has the adsorption capabilities of prior art adsorber 34 as described above.

Embodiment 134 comprises a structural housing 100 having an axis 101 and having a size and shape specifically selected to fit into a predetermined portion of the air intake ducting of an internal combustion engine, for example, cylindrical. A continuous strip 102 of a thin, flexible, activated charcoal sheet material is spirally disposed within opening 110 of housing 100 and may be bonded as by adhesive or insert molding to a plurality of radial retainers 104 to control and maintain spacing between the convolutions of the spiral. Retainers 104 may optionally include fingers 104a for holding adjacent strips of material in place. The width of strip 102 (which is the length of the adsorption path), the number of convolutions, and the spacing of the convolutions may be varied to meet specific application requirements. Of course, the convolutions alternatively may be formed by using a plurality of individual concentric cylindrical sheet elements.

A suitable pollutant-treating material for strip 102 is an activated carbon paper available from MeadWestvaco Specialty Papers, Stamford, Conn., USA. This material contains up to 50% by weight of activated carbon and avoids the problem of carbon dusting because the carbon is added to the papermaking slurry prior to paper formation, resulting in a sheet with minimum shedding.

While prior art cartridge 134 is highly effective in adsorbing hydrocarbon vapors, it has several practical problems.

First, the activated carbon sheet material 102 can be difficult to roll precisely without creasing or cracking; hence, a durable support for the sheet material would be desirable.

Second, the cabon sheet material is free-standing within housing 100 and can be subject to damage by unintended entry of foreign objects, thus partially blocking the inflow of air and potentially creating debris to be sucked into the engine.

Third, the convolutions of carbon sheet material are not inherently spaced apart in the spiral and thus require retainers 104 and preferably fingers 104a extending from retainers 104 for positioning and retaining the convolutions in place, adding to the cost and complexity of manufacture of cartidge 134.

Figure 3:
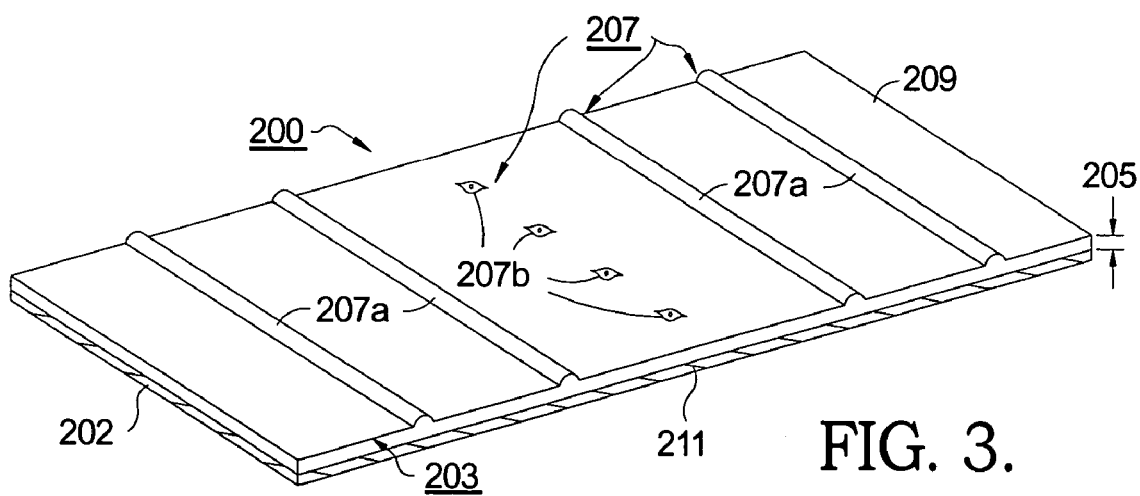
FIG. 3 is an isometric view of a laminated sheet for forming a spiral-wound adsorber in accordance with the invention.

Referring to FIG. 3, a laminated sheet element 200 for forming a hydrocarbon adsorber apparatus comprises an activated carbon sheet material 202 substantially the same as pollutant-treating material 102 previously disclosed. A sheet backing element 203 is formed as by extrusion of a fuel-inert polymer such as polyethylene, polypropylene, nylon, or the like. Element 203 is of substantially uniform base thickness 205 and is provided with features 207 raised above a first planar surface 209. Exemplary features shown in FIG. 3 are transverse ribs 207a and bumps 207b. Sheet material 202 is bonded in known fashion to a second planar surface 211 of backing element 203 to provide a durable support for the pollutant-treating material during fabrication and subsequent use of an adsorber in accordance with the invention.

Figure 4:
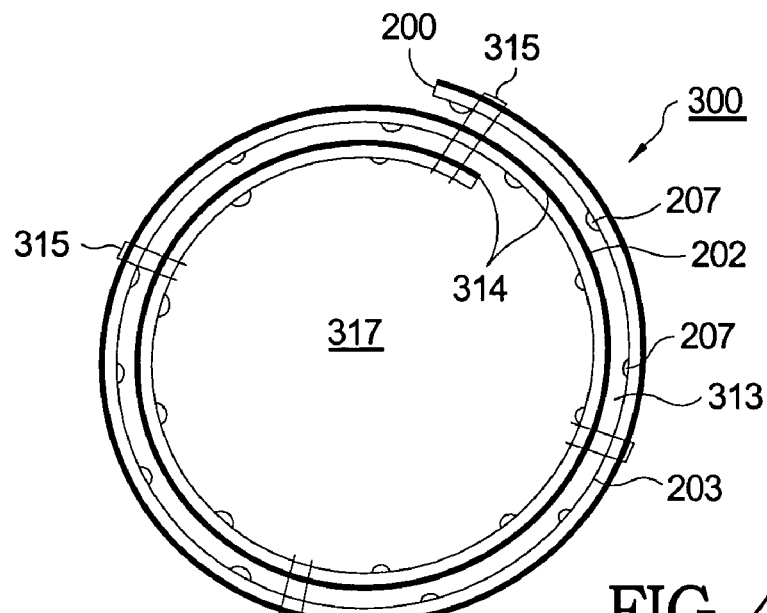
FIG. 4 is a front elevational view of a first embodiment of a spiral-wound adsorber formed from the laminated sheet shown in FIG. 3.

Referring to FIG. 4, a hydrocarbon adsorber 300 in accordance with the invention is formed by spiral-winding sheet element 200 such that features 207 define spacers against adjacent portions of carbon sheet material 202, creating a spiral space 313 between the convolutions 314 of the spiral for flow of gas. Sheet element 200 may be wound with either the carbon sheet material 202 or the inert sheet backing element 203 on the outside, although in a currently preferred embodiment carbon sheet material 202 is on the inside to maximize exposure of the adsorptive material to migrating hydrocarbon vapors. Preferably, the convolutions are held together by conventional radial fasteners 315 such as staples, rivets, screws, pins, or the like.

The number of convolutions in the spiral may be varied to meet the requirements of any specific engine application. In the extreme, the entire inner region 317 of adsorber 300 may be filled with convolutions, similar to prior art adsorber 134. In less demanding applications, and especially where high airflow volumes are a requirement, fewer convolutions may be preferable, as shown exemplarily in FIG. 4.

In a currently-preferred embodiment, adsorber 300 is fitted into a housing (not shown) similar to prior art housing 100 to form a cartridge.

Figure 5:
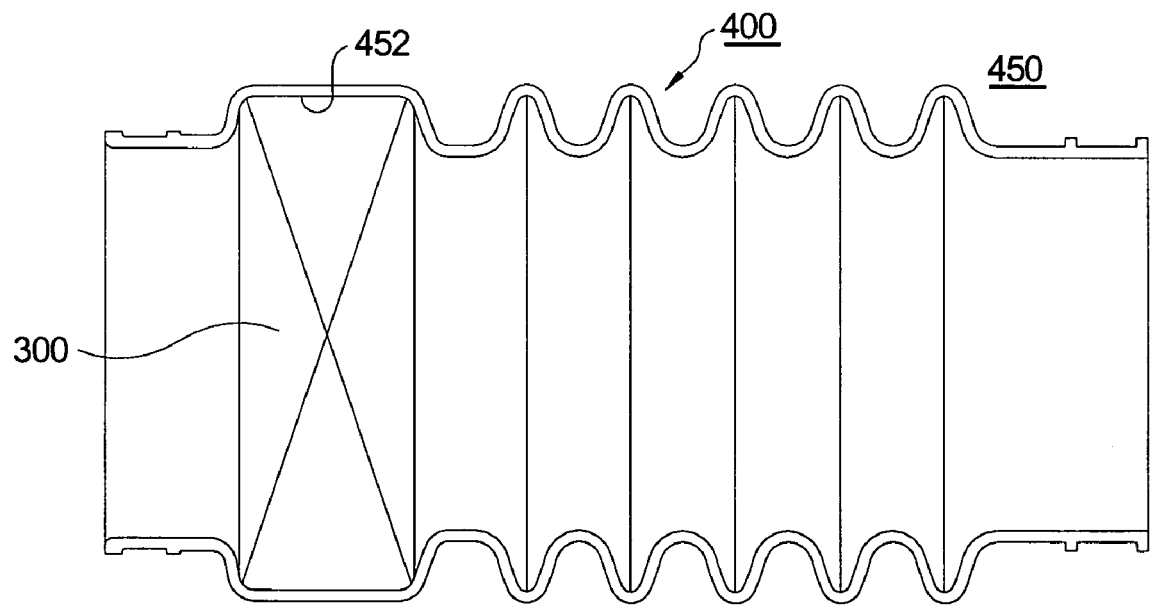
FIG. 5 is a cross-sectional elevational view of a flexible intake manifold entrance element showing installation of the novel adsorber shown in FIG. 4.

Referring to FIG. 5, an intake duct 400 for an engine 450 may be conveniently formed as a resilient corrugated boot having a pocket 452 molded therein for receiving adsorber 300.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A hydrocarbon adsorber for installation into an element of an air intake system of an internal combustion engine to adsorb hydrocarbon vapors migrating out of the air intake system during engine shutdown periods, the adsorber being formed by spiral winding of a sheet element into a plurality of convolutions, said sheet element comprising:
   a) a pollutant-treating sheet material including activated carbon; and
   b) a support element formed of an inert material,
   wherein said support element includes a plurality of features extending from a first surface thereof, and
   wherein said sheet material is bonded to a second surface of said support element opposite said first surface to form said sheet element, and
   wherein said spiral winding of said sheet element causes one or more of said features of each convolution to be brought into contact with said sheet material of the adjacent convolution, defining a spiral space for passage of gas through said hydrocarbon adsorber.

2. An adsorber in accordance with claim 1 further comprising a housing for forming an adsorber cartridge.

3. An adsorber in accordance with claim 1 wherein said sheet material is a carbon-loaded paper formed from a carbon-containing slurry.

4. An adsorber in accordance with claim 1 wherein said features are selected from the group consisting of ribs, bumps, and conbinations thereof.

5. An adsorber in accordance with claim 1 wherein said support element is formed from a polymer selected from the group consisting of polyethylene, polypropylene, nylon, and combinations thereof.

6. An internal combustion engine including an air intake system comprising an adsorber to adsorb hydrocarbon vapors migrating out of the air intake system during engine shutdown periods, said adsorber being formed by spiral winding of a sheet element into a plurality of convolutions,
   wherein said pollutant-treating sheet element includes a sheet material including activated carbon, and a support element formed of a fuel-inert material, and
   wherein said support element includes a plurality of features extending from a first surface thereof, and
   wherein said carbon-containing sheet material is bonded to a second surface of said support element opposite said first surface to form said sheet element, and
   wherein said spiral winding of said sheet element causes said features of each convolution to be brought into contact with said sheet material of the adjacent convolution, defining a spiral space for passage of gas through said hydrocarbon adsorber.

* * * * *